(12) United States Patent
Xu et al.

(10) Patent No.: US 7,454,374 B2
(45) Date of Patent: Nov. 18, 2008

(54) METHOD FOR EVALUATING A FORWARD-BUY OPPORTUNITY

(75) Inventors: Estella Xu, Alpharetta, GA (US); Hena Bar, Atlanta, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 1281 days.

(21) Appl. No.: 10/610,945

(22) Filed: Jun. 30, 2003

(65) Prior Publication Data

US 2004/0267582 A1    Dec. 30, 2004

(51) Int. Cl.
*G06Q 40/00* (2006.01)
(52) U.S. Cl. .......................................... 705/35; 705/40
(58) Field of Classification Search ................... 705/35, 705/36 R, 37, 40
See application file for complete search history.

(56) References Cited

U.S. PATENT DOCUMENTS

| | | | |
|---|---|---|---|
| 5,615,109 A | 3/1997 | Eder | 395/208 |
| 6,167,385 A | 12/2000 | Hartley-Urquhart | 705/35 |
| 6,556,976 B1 | 4/2003 | Callen | 705/37 |
| 7,092,929 B1 * | 8/2006 | Dvorak et al. | 705/28 |

OTHER PUBLICATIONS

Alsop, Ronald. "Retailers Buy Far in Advance to Exploit Trade Promotions". The Wall Street Journal. (Eastern Edition). New York, NY: Oct. 9, 1986. p. 1.*
Weinstein, Steve. "Wholesalers: It's Time for a Reappraisal". Progressive Grocer. New York: Mar. 1992. vol. 71, Iss. 3. p. 74 4 pgs.*
Lal et al. "A Theory of Forward Buying, Merchandising, and Trade Deals". Marketing Science (1986-1998) Winter 1996; 15, 1; ABI/INFORM Global p. 21.*

* cited by examiner

*Primary Examiner*—Lalita M. Hamilton
(74) *Attorney, Agent, or Firm*—Cantor Colburn LLP

(57) ABSTRACT

A method for evaluating a forward-buy opportunity relating to a product set is provided. At the outset, an incremental forward buy quantity for each product in the product set is initialized to a user defined quantity. Financial and product parameters relating to the products in the product set are input, and a return on investment (ROI) for each product is calculated. In response to the calculated ROI being equal to or greater than a defined value, the product having the highest ROI is identified and the recommended buy quantity is recorded. The recommended buy quantity for the identified product is incremented and the ROI for each product is recalculated. The iterative ROI calculation method continues until the ROI for each product is no longer equal to or greater than the defined value.

12 Claims, 1 Drawing Sheet

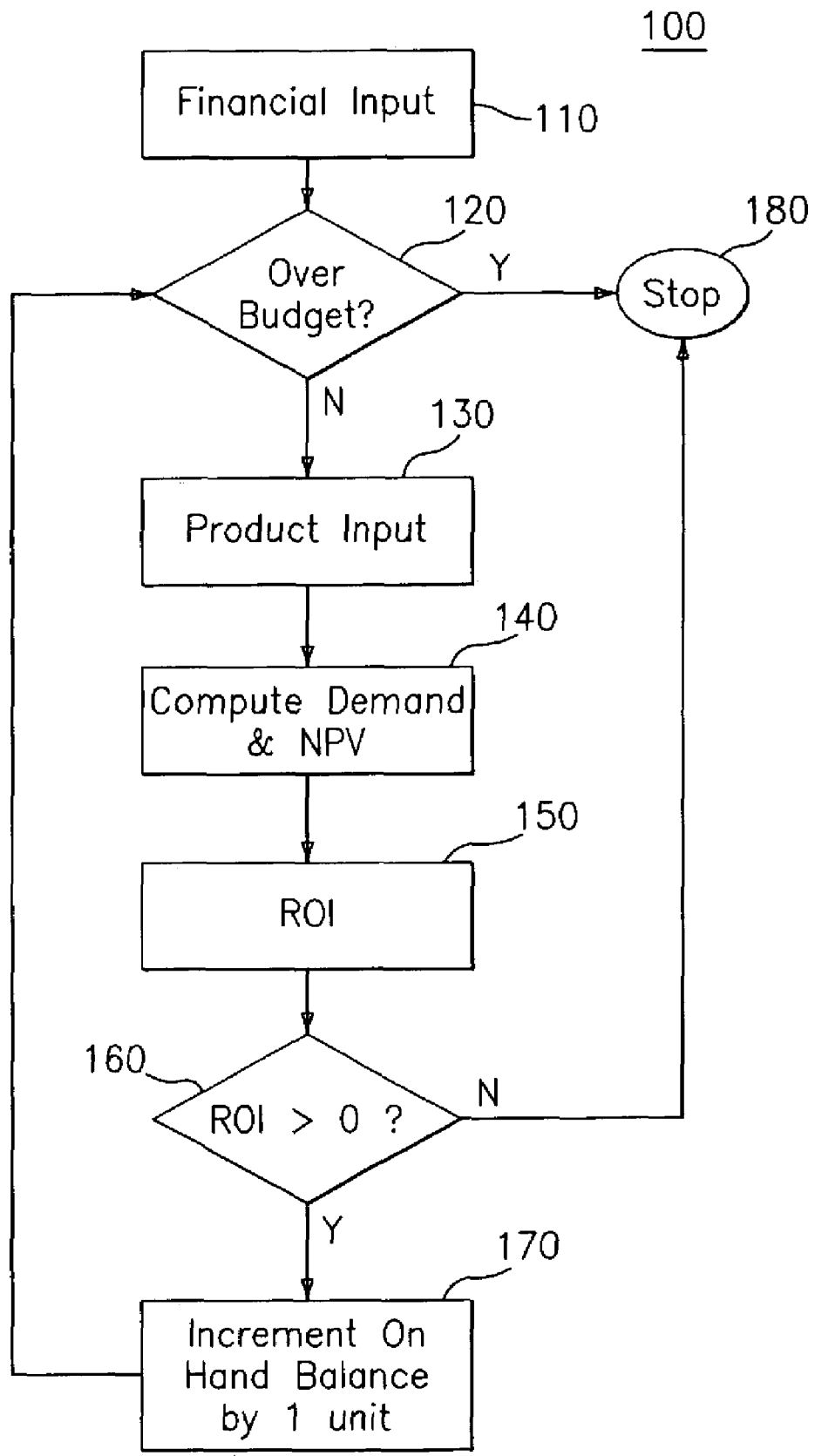

METHOD FOR EVALUATING A FORWARD-BUY OPPORTUNITY

BACKGROUND OF THE INVENTION

The present disclosure relates generally to a method for evaluating a forward-buy opportunity relating to a set of products, and particularly to an iterative method for evaluating forward-buy opportunities across multiple products and multiple vendors by taking into consideration a variety of costs, discount rates, budget amounts, and product demand forecast materialization probabilities.

Existing purchasing tools used to evaluate volume purchasing deals of a product may take into consideration different suppliers offering different price discount brackets depending on the intended purchase quantity, but they typically assume that the quantity to be purchased is either fixed or known. Products with deep discount prices, but not offered in bulk quantity, might not be considered. These tools also may not always consider all of the associated costs, and may use an assignment approach to assign a portion of the purchase volume to different suppliers based on their respective price discounts. Accordingly, there remains a need in the art for a purchasing analysis tool that provides a greater degree of flexibility in analyzing forward-buy opportunities across multiple vendors and products while considering a robust set of financial and product related parameters that may or may not be fixed or known.

SUMMARY OF THE INVENTION

In one embodiment, a method for evaluating a forward-buy opportunity relating to a product set is provided. At the outset, an incremental forward buy quantity for each product in the product set is initialized to a user defined quantity. Financial and product parameters relating to the products in the product set are input, a probability of demand materialization, and a resulting return on investment (ROI) for each product is calculated. In response to the calculated ROI being equal to or greater than a defined value, the product having the highest ROI is identified and a recommended buy quantity is recorded. The recommended buy quantity for the identified product is incremented and the ROT for each product is recalculated. The iterative ROI calculation method continues until the ROI for each product is no longer equal to or greater than the defined value.

In another embodiment, an iterative method for comparing forward-buy purchasing opportunities across multiple products in a product set is provided. At the outset, an incremental forward buy quantity for each product in the product set is initialized to a user defined quantity. Financial and product information relating to the product set is input, and products having an undesirable product trend are filtered out of the analysis. For each product, a probability of demand materialization and a resulting ROT is calculated. In response to the ROI being acceptable, the product having the highest ROI is identified and a recommended buy quantity relating to that product is recorded. The recommended buy quantity of the identified product is incremented and the ROI for each product in the product set is recalculated until each ROI calculation is no longer acceptable.

BRIEF DESCRIPTION OF THE DRAWINGS

Referring to the exemplary drawing, an exemplary flow diagram for evaluating a forward-buy opportunity in accordance with an embodiment of the invention is depicted.

DETAILED DESCRIPTION OF THE INVENTION

An embodiment of the invention provides a method for evaluating forward-buy opportunities relating to multiple products, where the purchase of more than immediate demand requirements may enable the purchaser to take advantage of price discounts that coincide with product availability on the secondary reuse market. While the embodiment described herein depicts the purchase of a product, or set of products, as an exemplary forward-buy opportunity, it will be appreciated that the disclosed invention is also applicable to other forward-buy opportunities. As used herein, the term product is intended to include physical products and services.

An exemplary embodiment of a method 100 for evaluating a forward-buy opportunity is illustrated. Method 100, alternatively referred to as a forward-buy tool, is an iterative method that looks at many financial and product parameters for a given product set and applies this information to compute and compare the return on investment (ROI) for each product with the hypothetical purchase of one more of each product. An exemplary product set includes a selection of comparable connectors from multiple vendors for a telecommunications application. The iterative analysis continues until the declining ROI with each new hypothetical purchase is either no longer positive or falls below a predefined acceptable value. At block 110, the user defined incremental forward buy quantity for each product is initialized to one, and financial information is input, which may include inventory carrying costs specific to the company or specific to the product families under consideration; discount rates specific to the vendor or products to bring the future value of money to the value of today; and, purchasing budget. The inventory carrying costs, either for the company or for the product families, may include such things as: capital cost; inventory service cost, such as property tax or insurance; storage cost, such as warehousing or handling; and, obsolescence risk cost, for example.

At block 120, an optional over-budget determination is made. If a purchasing budget has been input, method 100 will stop when the hypothetical total spend from buying products reaches or exceeds the purchasing budget limit. If no purchasing budget has been input, then method 100 will evaluate the situation for a recommended buy quantity based on a positive ROI calculation. While reference is made herein to a positive ROI calculation, it will be appreciated that any defined ROI may be used as a threshold minimum ROI that is acceptable to the business.

At block 130, product-related parameters for each product are input, which may include: vendor name; part or product name; average historical net demand; standard deviation of the net demand; forecast of the net demand; on-hand balance; discounted price; original price; type of statistical fit to be used for the demand materialization calculation; and, quantity of product available from the vendor for each product selling at a discounted price. Where multiple vendors are offering a discounted price for a variety of products, then each product from each vendor will be compared against one another, and method 100 will optimize, based on ROI, a recommended buy quantity for each product from each vendor.

Method 100 uses a demand materialization calculation to look at the probability of a purchasing demand materializing after the hypothetical purchase of one more unit of the product, and whether there is a marginal benefit to buying one extra unit with consideration to the associated inventory carrying costs. For demand materialization probability analysis, a statistical fit for the historical net demand is needed, such as a normal distribution, gamma distribution, or geometric distribution, for example. However, different statistical fitting is optional. If the product demand is quite stable, then a user may assume a normal distribution for the demand of the products in the analysis. If a user faces product demand patterns that do not follow a normal distribution, the user may employ statistical fitting to find a better fit than normal distribution. The purpose of using statistical fitting analysis is to find the best fit for the net demand pattern for each product. Such demand pattern is used to compute the probability of demand materialization in future time periods based on its historical variability. In an embodiment, method 100 employs batch fitting of demand patterns, where method 100 automatically runs statistical fits for a number of product net demands without manually having to fit one product at a time. For example, weekly net demand may be used to run the statistical fit to represent the demand pattern for each product. Historical net demand may also be refitted in order to have method 100 reflect changes in the demand pattern.

Historical net demand and changes in the demand pattern may also be used for performing a trending analysis, which may then be used to pre-filter out products having declining demands, unpredictable net demands, or demands below a minimum threshold. In applying a pre-filter process, obsolescence risks in a forward buy deal may be minimized. Another benefit to employing trending analysis is the detection of products having a net demand with a positive upward trend. Here, the user may detect this positive trend and adjust the forecast of net demand upward to take advantage of the present discounted price offered. In an embodiment, trending analysis is performed using regression analysis. Exemplary filtering rules include: excluding products with a yearly demand below a threshold quantity; excluding products with a declining demand; excluding products with brand new unproven technology; and, excluding products with a large coefficient of variability, for example.

The quantity of product available from the vendor may be used as a product availability constraint when applying method 100. The user may choose to run either a constrained or an unconstrained version of method 100. If an unconstrained version is employed, method 100 will analyze and report on forward-buy opportunities even though the supply of product may not be there. In such a scenario, method 100 may inform the user that at such discounted price, certain products without enough supply from the existing vendor base actually offer a higher ROI than some other products with enough supply. With this valuable and unexpected information, the user of method 100 has the advantage of actively shopping for certain products from an expanded supply base, thereby achieving a better financial return based on the limited capital resource that a particular company may have.

At block 140, various computations are made, including: the probability of demand materialization with respect to forward-buying one additional unit; the cost at time zero without a forward-buy and the associated net present value (NPV); and, the cost at time zero with a forward-buy and the associated NPV. The NPV calculation is performed using known financial analysis techniques.

Regarding the probability of demand materialization computation, for each product in the analysis method 100 computes the probability of demand materialization, taking into consideration the current on hand balance and the forward-buying of one unit, in each of three consecutive future time periods, time period 1, 2 and 3. Method 100 also computes the probability of demand not materializing within the aggregate of those same three time periods. In an exemplary embodiment, each time period is 30-days, however, other time periods may be employed as appropriate for a particular business or purchasing deal. The four different probability percentages are mutually exclusive and therefore add up to 100%. Method 100 bases the probability calculation on the statistics of the product, which include: the statistical distribution fit for the demand; the on-hand balance of the product; the forecast net demand; the average of net demand; and, the standard deviation of the net demand, for example. If no statistical distribution fit is input by the user, a normal distribution is assumed.

Regarding the cost and NPV without a forward-buy computation, method 100 assumes that products will be purchased only where it is known that the demand will materialize in the current time period (that is, time period 1, 2 or 3). In this scenario, the hypothetical purchasing is performed on an as-needed basis. Cash outflow, in the amount of the original unit purchase price paid for the consumption of the product, occurs at the end of each time period. For example, if demand materialization is being analyzed in the three future time periods, the total cost at time zero is the sum of the unit purchase price multiplied by the probability of demand materialization for each time period, which is then discounted back to time zero considering the time value of money. From here, the NPV without forward-buy is calculated.

Regarding the cost and NPV with a forward-buy computation, method 100 performs an upfront hypothetical buy of one unit of the product at a discounted price. In this scenario, the purchased unit has either a demand materialization probability in any of the three time periods, or no demand materialization at all. Here, the total costs include three elements: cash flow; inventory carrying cost; and, salvage value. The cash flow cost is considered to be the amount of the unit discounted price multiplied by the quantity one that is paid at time zero. The inventory carrying cost is computed by adding: (1) half of the inventory carrying cost for the probability of demand materializing in the current period; and (2) full inventory carrying cost for the probability of demand materializing in the subsequent time periods; and (3) inventory carrying cost for the one unit for the entire three future time periods, if demand does not materialize at all. The inventory carrying cost for each different time period is then discounted back to time zero considering the time value of money. The salvage value is assessed at the end of a future time period, for example, at the end of time period three, if demand does not materialize, and is discounted back to time zero considering the time value of money. From here, the NPV with forward-buy is calculated.

While embodiments disclosed herein may refer to specific methods for establishing a financial model, such as with the NPV calculations discussed above, it will be appreciated that the disclosed invention is not limited to a particular financial model and that other financial models may be employed as appropriate for a particular business.

At block 150, the return on investment (ROT) for each product is calculated by taking into consideration the NPV's discussed above, and the cost of investment associated with buying one unit of the product at the discounted price. In an exemplary embodiment, the percent ROT is calculated to be:

$$\% \text{ ROI} = \frac{(\text{NPV with forward-buy}) - (\text{NPV without forward-buy})}{\text{(investment cost of buying one unit at discounted price)}} \quad \text{Equa. 1}$$

For each product, method 100 records the ROT and the accumulated recommended forward-buy quantity (recommended buy quantity).

At block 160, method 100 determines the ROT for each product, and whether the ROT is positive, or above a minimum threshold value. Method 100 also determines whether the accumulated recommended forward-buy quantity exceeds the available quantity at the vendor. If the ROT is positive or above a minimum threshold value, and the recommended buy quantity does not exceed available supply, then method 100 passes to block 170. In each iteration, the ROT for each product is computed and the highest ROT is selected. The ROT in the current iteration might be equal to or less than the previous one, and it might be the same product or a different product with the highest ROT.

At block 170, method 100 selects the product candidate whose positive ROI is the highest of the group and whose accumulated recommended forward-buy quantity does not exceed the available supply. The selected product, Product-X for example, is then recorded as the recommended buy candidate for this iteration. With reference to Product-X, method 100 then: records the buying of one unit of Product-X at the discounted price and increases the on-hand balance of Product-X by one unit; records the accumulated buy quantity recommendation of Product-X; and, records the accumulated spend amount, which equals the accumulation of all dollars relating to the recommended buy. With the on-hand quantity of Product-X having been incremented by one unit, method 100 then loops back to block 120 to continue to iterative analysis. While the exemplary embodiment initializes the user defined incremental forward buy quantity to one, and increments the recommended buy quantity by one on each iteration, it will be appreciated that other quantities may be used for the initial and incremental values.

The two decision points where method 100 may jump out of the iterative loop are at blocks 120 and 160. At block 120, if the purchasing budget has been exceeded by the hypothetical total spend from buying products, such as Product-X for example, then method 100 stops and a final report out is made at block 180. At block 160, if the ROI for each product in the analysis is no longer positive, or falls below the defined minimum threshold value, then method 100 also stops and a final report out is made at block 180. In an embodiment, the final report out includes a recommendation for optimal quantities to buy from selected vendors on selected products.

In an embodiment and in the first round of iteration of method 100, the highest ROI is determined, which should be the highest ROI for the entire process because the product with the highest ROI is selected to be bought first. In each subsequent iteration, method 100 attempts to select the highest ROI. The ROI from the second iteration might be the same or less than the previous iteration, depending on the costs and demand materialization probability, for example. As long as the highest ROT from each iteration is above zero or above an acceptable threshold, the product with such ROT will be selected as the forward buy candidate. The ROI from a subsequent iteration is usually not larger than the ROI from the previous iteration, because once more quantities are accumulated in a forward buy deal, the accumulated products tend to be used in later time periods, and the quantities used first tend to have a higher ROI because less inventory carrying cost is associated with holding them while anticipating for a demand materialization in the future time periods.

As a result of using method 100, which may be applied to a wide variety of products available in the secondary market, a powerful solution to determine the right products and the right quantities to buy when third party suppliers offer price discounts, in bulk or in small quantities, is provided. Products may not always be available in the secondary market, and when they do become available they may not be available in bulk quantity. By using method 100, appropriately termed a forward-buy tool, the optimal quantity to buy can be determined while minimizing overall system wide costs. By utilizing information relating to supply unavailability, price variations, and probability of demand materialization, method 100 may assist in determining an advantageous forward-buy strategy.

An embodiment of the invention may be provided in executable instruction form on a storage medium that is readable by a processing circuit, the processing circuit being in signal communication via application software with a graphical user interface at a computer, whereby a user may execute the embedded instructions for practicing the disclosed invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for evaluating a forward-buy opportunity relating to a product set, comprising:
   initializing a user defined incremental forward buy quantity for each product in the product set;
   inputting a financial parameter relating to at least one of an inventory carrying cost or a discount rate;
   inputting a product parameter relating to at least one of a product demand, a product quantity, or a product price;
   calculating a return on investment for each product in the product set in response to the financial and product parameters;
   determining whether the calculated return on investment is equal to or greater than a defined value;
   in response to the calculated return on investment being equal to or greater than a defined value, identifying the product having the highest return on investment and recording a recommended buy quantity relating to that product; and
   incrementing the recommended buy quantity of the identified product and recalculating the return on investment for each product in the product set until each return on investment calculation is no longer equal to or greater than the defined value.

2. The method of claim 1, wherein calculating a return on investment for each product in the product set further comprises:
   calculating a net present value without a forward buy for each product in the product set, thereby defining a first value;
   calculating a net present value with a forward buy of an additional unit for each product in the product set, thereby defining a second value;
   calculating an investment cost of buying an additional unit for each product in the product set, thereby defining a third value; and calculating a return on investment as a function of the first, second and third values.

3. The method of claim 2, wherein the function of the first, second and third values comprises:
subtracting the first value from the second value, and dividing the difference by the third value.

4. The method of claim 2, further comprising:
calculating a probability of demand materialization in response to the purchase of an additional unit of each product within a defined time period;
calculating a probability of no demand materialization in response to the purchase of an additional unit of each product within the defined time period; and
wherein the net present value with a forward buy takes into consideration the probability of demand materialization.

5. The method of claim 4, wherein the defined time period comprises:
a first future time period, a second future time period, and a third future time period;
wherein the first, second and third future time periods are consecutive and equal in duration.

6. The method of claim 1, wherein the, product parameter includes a product availability limit, and further comprising:
determining whether the return on investment calculation for the product exceeds an acceptable threshold value;
determining whether the recommended buy quantity for the product exceeds the product availability limit for that product; and
in response to the return on investment calculation exceeding an acceptable threshold value for the product and the recommended buy quantity having not exceeded the product availability limit, identifying the product having the highest return on investment and recording the recommended buy quantity relating to that product.

7. The method of claim 1, further comprising:
inputting a financial parameter relating to a purchasing budget;
determining whether a cost relating to the recommended buy quantity exceeds the purchasing budget; and
in response to the cost exceeding the purchasing budget, concluding the forward-buy opportunity evaluation.

8. The method of claim 1, wherein
the inventory carrying cost includes at least one of a capital cost, an inventory service cost, a storage cost, or an obsolescence risk cost; and
the product parameter includes a statistical distribution of product demand.

9. The method of claim 1, further comprising:
inputting a product parameter relating to a product trend; and
filtering out from the product set those products having a product trend indicative of a declining demand, an unpredictable demand, or a demand below a defined threshold.

10. An iterative method for comparing forward-buy purchasing opportunities across multiple products in a product set, comprising:
initializing for each product a user defined incremental forward buy quantity;
inputting financial and product information relating to each product of the product set, the product information including a statistical distribution of product demand, a current on hand balance, and a parameter relating to product trend;
filtering out from the product set those products having an undesirable product trend;
calculating for each product a probability of demand materialization in response to the statistical distribution of product demand, the current on hand balance, and a purchase of an additional unit of that product to increase the current on hand quantity;
calculating a return on investment for each product in the product set, the calculation factoring in a cost relating to the probability of demand materialization;
determining whether the return on investment is acceptable;
in response to the return on investment being acceptable, identifying the product having the highest return on investment and recording the recommended buy quantity relating to that product; and
incrementing the recommended buy quantity of the identified product and recalculating the return on investment for each product in the product set until each return on investment calculation is no longer acceptable.

11. The method of claim 10, wherein the financial information includes a purchasing budget and further comprising:
determining whether a cost relating to the recommended buy quantity exceeds the purchasing budget; and
in response to the cost exceeding the purchasing budget, concluding the iterative method.

12. The method of claim 10, wherein the product information includes a product availability limit, and further comprising:
determining whether the highest return on investment for the product set is above a minimum threshold value;
determining whether the recommended buy quantity for each product exceeds the product availability limit for that product; and
in response to the return on investment calculation being above a minimum threshold value and the recommended buy quantity having not exceeded the product availability limit, identifying the product having the highest return on investment and recording the recommended buy quantity relating to that product.

* * * * *